(12) United States Patent
Jünke

(10) Patent No.: US 10,518,594 B2
(45) Date of Patent: Dec. 31, 2019

(54) VEHICLE, COMPRISING AT LEAST TWO VEHICLE PARTS ARTICULATED TO EACH OTHER

(71) Applicant: Hübner GmbH & Co. KG, Kassel (DE)

(72) Inventor: Volker Jünke, Kassel (DE)

(73) Assignee: Hübner GmbH & Co. KG, Kassel (DE)

( * ) Notice: Subject to any disclaimer, the term of this patent is extended or adjusted under 35 U.S.C. 154(b) by 47 days.

(21) Appl. No.: 15/744,270

(22) PCT Filed: Jul. 1, 2016

(86) PCT No.: PCT/EP2016/065483
§ 371 (c)(1),
(2) Date: Jan. 12, 2018

(87) PCT Pub. No.: WO2017/009069
PCT Pub. Date: Jan. 19, 2017

(65) Prior Publication Data
US 2018/0201080 A1    Jul. 19, 2018

(30) Foreign Application Priority Data

Jul. 15, 2015  (EP) .................................... 15176772

(51) Int. Cl.
| | |
|---|---|
| *B60D 5/00* | (2006.01) |
| *B61D 17/22* | (2006.01) |
| *B62D 47/02* | (2006.01) |
| *B61D 17/20* | (2006.01) |

(52) U.S. Cl.
CPC ............. *B60D 5/003* (2013.01); *B61D 17/20* (2013.01); *B61D 17/22* (2013.01); *B62D 47/025* (2013.01)

(58) Field of Classification Search
CPC ........ B60D 5/003; B61D 17/20; B61D 17/22; B62D 47/025
See application file for complete search history.

(56) References Cited

U.S. PATENT DOCUMENTS

| | | | |
|---|---|---|---|
| 843,233 | A | 2/1907 | Perry, Sr. et al. |
| 3,410,226 | A | 11/1968 | Krupp |
| 4,599,947 | A * | 7/1986 | Keefer ................... B61D 17/22 105/15 |
| 4,727,814 | A * | 3/1988 | Nielsen .................. B61D 17/02 105/1.1 |

(Continued)

FOREIGN PATENT DOCUMENTS

| | | |
|---|---|---|
| EP | 0293051 A1 | 11/1988 |
| EP | 0499773 A1 | 8/1992 |

(Continued)

*Primary Examiner* — Joseph M Rocca
*Assistant Examiner* — Micahel R Stabley
(74) *Attorney, Agent, or Firm* — Dinsmore & Shohl LLP

(57) ABSTRACT

The invention relates to a cover between at least two vehicle parts of the type connected to one another in an articulated manner to form a vehicle e.g. a streetcar or an articulated bus, the cover comprising an at least U-shaped cover that is elastically yielding, the U-shaped cover bridging a space between the two vehicle parts, wherein the U-shaped cover being double-walled, with an outer wall and an inner wall being formed in one part.

18 Claims, 2 Drawing Sheets

(56) References Cited

U.S. PATENT DOCUMENTS

| | | | | |
|---|---|---|---|---|
| 4,905,607 A * | 3/1990 | Wanneroy | ............... | B60D 5/006 |
| | | | | 105/15 |
| 5,060,577 A * | 10/1991 | Steinmetz | ............... | B61D 17/22 |
| | | | | 105/15 |
| 8,424,461 B2 * | 4/2013 | Goebels | ................. | B61D 17/22 |
| | | | | 105/15 |
| 8,869,706 B2 * | 10/2014 | Koukal | ..................... | B60D 5/00 |
| | | | | 105/15 |
| 2010/0025961 A1 * | 2/2010 | Tabellini | ................ | B60D 5/003 |
| | | | | 280/403 |

FOREIGN PATENT DOCUMENTS

| | | |
|---|---|---|
| EP | 2082942 A1 | 7/2009 |
| EP | 2236323 A2 | 10/2010 |
| EP | 2740618 A1 | 6/2014 |
| KR | 20140132933 A | 11/2014 |

\* cited by examiner

VEHICLE, COMPRISING AT LEAST TWO VEHICLE PARTS ARTICULATED TO EACH OTHER

CROSS-REFERENCE TO RELATED APPLICATIONS

This application is the U.S. national stage of PCT/EP2016/000751 filed May 9, 2016, which claims priority of European Patent Application 15001921.4 filed Jun. 29, 2015 of which is hereby incorporated by reference in its entirety.

FIELD OF THE INVENTION

The invention relates to a vehicle comprising at least two vehicle parts connected to one another in an articulated manner, e.g. a streetcar or an articulated bus, wherein an at least U-shaped cover that is configured as elastically yielding in itself is provided to bridge the spacing between the vehicle parts.

BACKGROUND OF THE INVENTION

Vehicles or vehicle parts connected to one another in an articulated manner, e.g. streetcars or also articulated buses, are typically characterized by a gangway between the two vehicle parts. The gangway in detail comprises a gangway platform or also a gangway bridge that is surrounded by a folding bellows or by a concertina bellows in at least a U shape, but frequently also in a tunnel shape. It is hereby ensured that persons can move between the individual vehicle parts without being exposed to the effects of weather. The bellows of the gangway is here able to accommodate all the travel movements between the two vehicle parts such as in particular kink movements, pitching and rolling movements and, with rail-bound vehicles, optionally also alternating movements. It follows from this that the bellows as part of the gangway is highly deformable.

In particular with rapidly traveling rail vehicles such as high-speed trains like the ICE or TGV, it is furthermore known to provide two bellows that are supported in one another to be able to ensure increased sound insulation or also to make improved thermal insulation possible. Furthermore, such double-concertina bellows provide that pressure impulses such as arise when such a vehicle travels into a tunnel at high speed, for example, are only transmitted into the interior of the gangway in attenuated form. Such double-concertina bellows are frequently very thick so that the passage clearance width between the vehicles in the region of the gangway is comparatively small so that is it not possible for wheelchair users to move to and fro between the vehicle parts in some cases. There is to this extent an endeavor to configure the passage clearance width between two vehicles as generously as possible in the region of the gangway.

A planar connection element or a connection element with a box-shape or U-shape peripherally in cross-section between two vehicles connected to one another in an articulated manner, wherein the connection element has a planar reinforcement material coated with an elastomer. The reinforcement material itself comprises a plurality of threads or yarns, wherein the threads or yarns are manufactured from an elastic material, in particular from a cross-linked silicone rubber. The arrangement of the threads or yarns in a fabric can here be such that it is elastically yielding in at least one spatial direction, but preferably in two spatial directions, which means that both the warp threads and the weft threads are manufactured from such an elastic material, in particular from a cross-linked silicone rubber.

It is known in this connection from EP 2 740 618 A1 to provide a cover that is elastic in itself between two vehicle parts as part of a gangway, wherein the cover is arranged flush at the outer skin at the front faces of the two adjacent vehicle parts to avoid swirl formation between the two vehicle parts and thus to avoid flow losses. Provision is made to stabilize the cover to provide the cover with peripheral frames, with the cover being fixable by tongues in the frames.

SUMMARY OF THE INVENTION

Starting from the prior art, the object underlying the invention comprises providing a cover between two vehicles parts connected to one another in an articulated manner in a vehicle of the initially named kind that provides increased sound insulation and that is furthermore thermally insulating, wherein the cover between the front faces of the two adjacent vehicle parts furthermore only has a small thickness. The cover should furthermore satisfy increased demands with respect to leak tightness, in particular with respect to penetrating water.

It is proposed in accordance with the invention to achieve the object to configure the cover as double-walled, with the outer wall and the inner wall being configured in one part and in particular being manufactured in one part here. Such a cover having an outer wall and an inner wall, composed of elastically yielding material, that is, for example, of a reinforcement material coated with an elastomer, whose threads or yarns are elastically yielding in themselves, such as threads or yarns composed or cross-linked silicone rubber, in particular satisfy increased demands on the leak tightness to the extent that they only consist of a single part or are manufactured as one part and to this extent have no double connection to the interior of the gangway such as is the case with a double-concertina bellows, wherein the two bellows of such a double-concertina bellows are, as is known, each per se fastened to the front wall of the vehicle part. Since the cover is configured in one piece, increased security against penetrating water is hereby provided. Furthermore, such a cover has an extremely slim construction, with the cover having a thickness overall of only 40 to 50 mm.

Advantageous features and embodiments of the invention result from the dependent claims.

Provision is thus in particular made that the outer wall and the inner wall are guided in one part between the vehicle parts in the manner of a loop. This means that the ends of the loop are connected to the respective front-face wall of the two vehicle parts. Provision is made for this purpose in accordance with a special feature of the invention that the cover is fastened to the front walls of the two vehicle parts by a respective clamping device. It is effected by such a clamping device that the material for the cover itself does not have to be damaged for the fastening to the front face of the respective vehicle. The following becomes clear from this: The cover is defected by 180° at at least the front face of the first vehicle part. The cover can likewise be closed, that is deflected by 180°, at the front face of the other oppositely disposed second vehicle part.

The ends of the cover can here e.g. be sewn or adhesively bonded to one another. However, the manufacture of a quasi-double-walled hose is also conceivable that is already closed at the front-face ends of the vehicle parts during the manufacture.

The cover is formed as tangentially peripheral in at least a U shape. This means that the cover is also closed in the region of the vehicle floor, that is in the region of the articulated connection of the two vehicle parts, that is it can be designed in box-shape or tunnel-shape peripherally.

To be able to assemble the cover more easily, the ends can be connected to one another in the longitudinal direction of the cover, that is in parallel with the longitudinal axis of the vehicle parts, after the assembly of the cover, e.g. by direct sewing or adhesive bonding or by a floor cloth. This means that the cover is open in the longitudinal direction before the assembly.

In detail, a receiving section that serves the reception of a deflection section for the cover is provided that is arranged with respect to the clamping device at the front wall of the respective vehicle part and is substantially U-shaped peripherally. The receiving section can here be manufactured from a metal and is preferably of C shape in cross-section. The cover is led around the deflection section, with the deflection section ultimately being supported with the cover supported thereon in the C-shaped cut-out of the receiving section that is in particular manufactured from metal. In order now to prevent the cover from being damaged by the receiving section, a so-called protective section is provided between the receiving section and the deflection section. Both the deflection section and, preferably, the protective section are manufactured from an elastomer. To achieve the reliable protection of the protective section or of the cover supported thereon, provision is made that the protective section encompasses the deflection section in the region of the receiving section.

In order furthermore to prevent a slipping of the cover on the deflection section, the two walls of the cover are secured by a tongue device on the deflection section. The tongue device itself comprises a tongue section that can be pressed into a corresponding groove and in the deflection section while encompassing the respective wall of the cover.

Provision is made in accordance with a further feature of the invention that at least one spacer is provided over the length of the cover between the outer wall and the inner wall of the cover. These spacers serve the stabilization of the cover, with provision furthermore being made in this connection that the fixing of the cover on the spacer takes place by a tongue connection; this means that the spacer has a groove, with a tongue being pressed into the groove while encompassing the outer wall or inner wall of the cover. The spacer can, like the deflection section, be manufactured from an elastomer. Furthermore, the spacer, in particular when it is also manufactured from an elastomer, can have a stiffening inlay, for example in the form of an aluminum section. Provision is in particular made in this connection that the cover is open in the longitudinal direction of the cover in the floor region to be able to push in the spacer.

It has already been pointed out that the cover is elastically yielding in one or two spatial directions. The cover here can have a reinforcement material, and indeed in the form of a fleece, of a fabric, or of a knitted fabric. The reinforcement material has elastic threads or yarns for the elastically yielding formation in one or two spatial directions, e.g. of cross-linked silicone rubber having modulus values of 20 to 100 cN/800%, in particular of 20 to 80 cN/800% elongation.

The cover is clamped under tensile stress between the front-face ends of the bodies of the vehicle parts connected to one another in an articulated manner. This is associated with a substantial effort for the persons who are involved in the assembly of such covers. To reduce the effort, it is proposed in accordance with a particular feature of the invention to pre-tension the cover in the axial direction in the starting state, that is in a state in which the cover is not assembled. This has the consequence that the reinforcement material of the cover is elongated. This furthermore has the consequence that, in such a pre-tensioned state of the cover, the total length extension of the cover required overall is reduced in assembly with respect to the non-tensioned starting state, which facilitates the assembly.

Provision is in detail made in this connection that a space into which a compressed medium can be introduced, for example a foam body that has a high resilience, is formed between two spacers and/or between a spacer and a deflection section. If such foam bodies are introduced into the previously described intermediate space under compression, that is in the pressed together state, the cover is hereby at least elongated in the region of these foam bodies; thus, as already stated, the cover is pre-tensioned overall, that is it is given a greater length than in the non-pre-tensioned, that is non-elongated, state.

It is also advantageous in the introduction of foam bodies into the space between two spacers or into the space between a spacer and a deflection section that sound insulation is hereby improved.

BRIEF DESCRIPTION OF THE DRAWINGS

The invention will be described in more detail in the following by way of example with reference to the drawings.

DETAILED DESCRIPTION OF THE INVENTION

Figure 1:
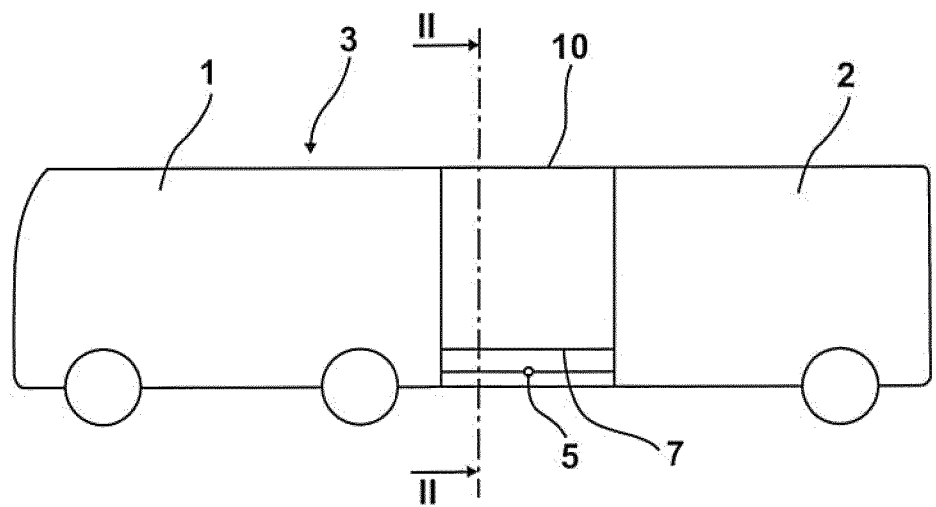
FIG. 1: schematically shows a vehicle having two vehicle parts that are connected to one another by an articulated connection.

The two vehicle parts 1 and 2 are connected to one another by a schematically shown articulated connection 5 to form an articulated vehicle 3. The platform 7 extends above the articulated connection. Both the platform 7 and the articulated connection 5 are surrounded in U shape or also like a tunnel by the cover marked by 10 (FIG. 2), with a floor cloth 12 being provided in the floor region to connect the two ends of the cover 10.

Figure 3:
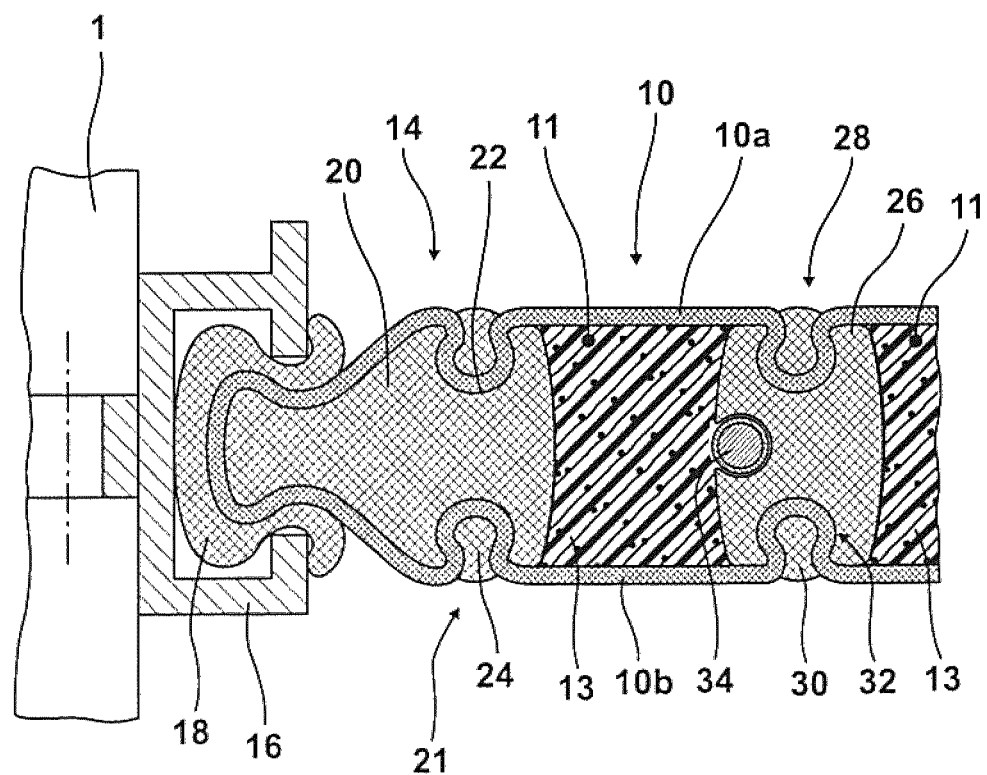
FIG. 3 shows a section in accordance with the line of FIG. 2.

The subject of the invention is now the configuration of the cover 10. The cover 10 is configured as a loop and connects the two front faces of the vehicle parts 1 and 2 that are adjacent to one another and are directed toward one another. The cover 10 is held at the two front faces of the vehicle parts 1 and 2 by a respective clamping device 14 in a U shape peripherally. The clamping device 14 comprises a receiving section 16 of metal that is C-shaped in cross-section and is arranged at the front face of the body, with a protective section 18 manufactured from an elastomer receiving the deflection section 20 in the C-shaped receiving section. Both the protective section 18 and the deflection section 20 are manufactured from an elastomer, wherein the cover with the outer wall 10*a* and the inner wall 10*b* configured in the manner of a loop is led around the two deflection sections 20 arranged at the front faces of the vehicle parts 1, 2, as results directly in the view of FIG. 3. The protective section 18 is designed here such that it screens the deflection section with respect to the C-shaped receiving section in the region of the C-shaped receiving section 16. In order now to prevent the cover 10 from slipping on the deflection section 20, the deflection section 20 has a tongue connection 21 having a groove 22, with the cover 10 being guided in the groove and with the cover being fixed in the groove by a tongue section 24 there.

Spacers 26 that can likewise comprise an elastomer and that connect the outer wall 10a and the inner wall 10b are provided between the two deflection sections to stabilize the cover 10. A tongue connection 28 is likewise provided to connect the outer wall 10a and also the inner wall 10b to the respective spacer 26, with the tongue section 30 of the tongue connection 28 being able to be pressed into a corresponding groove 32 of the spacer 26 to encompass the cover 10. Provision can furthermore be made to stabilize the spacer 26 by a reinforcing section 34, e.g. an aluminum section.

The tongue section 24, 30 can here equally be configured as U shaped or tunnel-shaped peripherally like the deflection section 20, the spacer 26 or the receiving section 16.

A foam body is introduced into the space 11 between the individual spacers 26 or into the space between the last spacer 26 and the deflection section 20, wherein the foam body is introduced under compression into the space 11 so that the spacing between the individual spacers 26 is increased due to the resilience of the foam body and thus the cover 10 is elongated at least in the region of the foam body 13. The same applies in principle to the space 11 between the respective last spacer 26 and the deflection section 20.

Figure 2:
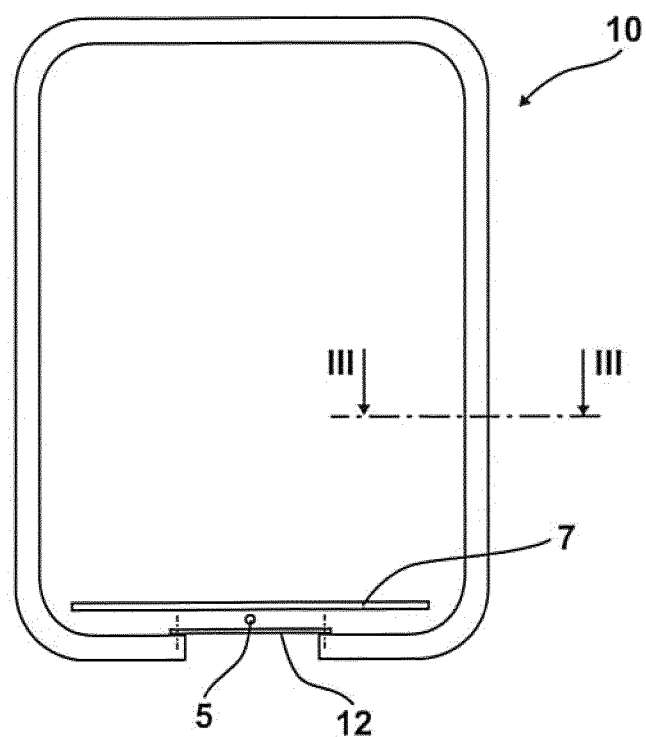
FIG. 2: shows a section in accordance with the line II-II in accordance with FIG. 1.

It has already been pointed out that the cover 10 in its configuration as a loop spans the platform 7 in a U shape or tunnel shape between the end faces of the two vehicle parts 1, 2, as results from the view of FIG. 2. Since the cover is elastically resilient at least in one spatial direction, but preferably in two spatial directions, which is in particular made possible by the use of a fabric of elastic threads and here in particular of cross-linked silicone rubber threads both in the weft direction and in the warp direction, such a U-shaped cover can accommodate all the travel movements that occur between the two vehicle parts.

REFERENCE NUMERAL LIST 1 vehicle part
2 vehicle part
3 articulated vehicle
5 articulated connection
7 platform
10 cover
10a outer wall
10b inner wall
11 space between two spacers and/or between a spacer and a deflection section
12 floor cloth
13 foam body
14 clamping device
16 receiving section
18 protective section
20 deflection section
21 tongue connection
22 groove
24 tongue section
26 spacer
28 tongue connection
30 tongue section
32 groove
34 reinforcement section

The invention claimed is:

1. A cover between at least two vehicles parts connected to one another in an articulated manner to form a vehicle, the cover comprising:
    an at least U-shaped cover that is elastically yielding, the U-shaped cover comprising a reinforcement material, the reinforcement material comprising elastic threads or yarns, the reinforcement material with the elastic threads or yarns being coated with an elastomer, the U-shaped cover bridging a space between the two vehicle parts;
    the U-shaped cover being double-walled, with an outer wall and an inner wall being formed in one part; and
    at least one U-shaped spacer extending along the U-shaped cover between the outer wall and the inner wall of the U-shaped cover.

2. A cover in accordance with claim 1, wherein the outer wall and the inner wall are manufactured in one part.

3. A cover in accordance with claim 1, wherein the outer and inner walls are formed in a loop, between the two vehicle parts.

4. A cover in accordance with claim 1, wherein each of the two vehicle parts comprises a front wall and the U-shaped cover is fastened to the front walls of each of the two vehicle parts by a clamping device.

5. A cover in accordance with claim 4, wherein the clamping device comprise a receiving section that is arranged at the front wall of the respective vehicle part, the receiving section being substantially U shaped peripherally and serving to receive a deflection section for the cover.

6. A cover in accordance with claim 5, further comprising a protective section disposed between the deflection section and the receiving section.

7. A cover in accordance with claim 6, wherein the protective section encompassing the deflection section in the region of the receiving section.

8. A cover in accordance with the claim 5, wherein the deflection section and/or the protective section is manufactured from an elastomer.

9. A cover in accordance with claim 5, wherein the cover is secured against slipping on the deflection section.

10. A cover in accordance with claim 1, further comprising at least one tongue connection, wherein the at least one tongue connection fixes the U-shaped cover on a deflection section or on the spacer.

11. A cover in accordance with claim 1, wherein the U-shaped cover is elastically yielding in one spatial direction or in two spatial directions.

12. A cover in accordance with claim 1, wherein the U-shaped cover surrounds a platform or bridge arranged between the two vehicle parts of a tunnel.

13. A cover in accordance with claim 1, wherein the reinforcement material comprise a fabric, a knitted fabric, or a fleece.

14. A cover in accordance with claims 1, wherein the at least one spacer has a reinforcement section.

15. A cover in accordance with claim 1, wherein the U-shaped cover is preloaded in an axial direction of the U-shaped cover in the state not installed between the two vehicle parts.

16. A cover in accordance with claim 1, further comprising a compressed medium introduced into a space between the two adjacent of the at least one spacer and/or between one of the at least one spacer and a deflection section.

17. A cover in accordance with claim 16, wherein the compressed medium is a foam body.

18. An articulated vehicle with at least two vehicle parts having a cover according to claim 1 between the at least two vehicle parts.

* * * * *